(12) United States Patent
Pavlovic et al.

(10) Patent No.: US 11,256,888 B2
(45) Date of Patent: Feb. 22, 2022

(54) SYSTEM AND METHOD EMPLOYING WIRELESS HIGH-VOLTAGE INTERLOCKING LOOP USING RFID-ENABLED ELECTRICAL CONNECTORS CONTAINING CONDUCTIVE MATERIAL

(71) Applicant: Global Inventive Consulting Inc., Etobicoke (CA)

(72) Inventors: Slobodan Pavlovic, Etobicoke (CA); Mohamad Zeidan, Bloomfield Hills, MI (US)

(73) Assignee: Global Inventive Consulting, Inc., Etobicoke (CA)

( * ) Notice: Subject to any disclaimer, the term of this patent is extended or adjusted under 35 U.S.C. 154(b) by 0 days.

(21) Appl. No.: 17/192,771

(22) Filed: Mar. 4, 2021

(65) Prior Publication Data

US 2021/0383081 A1    Dec. 9, 2021

Related U.S. Application Data

(63) Continuation-in-part of application No. 16/894,950, filed on Jun. 8, 2020.

(51) Int. Cl.
*G06K 7/10* (2006.01)
*H01R 13/641* (2006.01)
*H01R 13/66* (2006.01)

(52) U.S. Cl.
CPC ....... *G06K 7/10366* (2013.01); *H01R 13/641* (2013.01); *H01R 13/6691* (2013.01); *G06K 2007/10504* (2013.01)

(58) Field of Classification Search
CPC .......................... H01R 13/641; H01R 13/6691
See application file for complete search history.

(56) References Cited

U.S. PATENT DOCUMENTS

| | | | |
|---|---|---|---|
| 9,219,358 B2* | 12/2015 | Elberbaum | H05K 5/0017 |
| 10,794,121 B2* | 10/2020 | Hanton | E21B 17/06 |
| 10,915,714 B2* | 2/2021 | Ownby | E21B 23/04 |
| 10,949,558 B2* | 3/2021 | Dunaway | G16H 10/60 |
| 2007/0149013 A1* | 6/2007 | Eastham | H01R 13/7036 439/140 |

(Continued)

FOREIGN PATENT DOCUMENTS

DE    10 2017 110 123    * 10/2017

*Primary Examiner* — Jean F Duverne
(74) *Attorney, Agent, or Firm* — Heed Law Group PLLC; Thomas P. Heed

(57) ABSTRACT

The present invention is a wireless HVIL system and method using RFID-enabled Electrical Connector with connector position assurance ("CPA") features. Each RFID-enabled Electrical Connector has an RFID tag that is only readable after the CPA features of the RFID-enabled Electrical Connector have been fully deployed. If a CPA feature has not been fully deployed, electrically conductive material will obscure the RFID tag so that it cannot be read. At least one RFID reader is distributed so that all of the RFID tags are within its effective range. When system power is cycled on, the at least one RFID reader emits a digital pulse and reads all of the non-obscured RFID tags. If the at least one RFID reader detects all of the expected RFID tags, an HVIL processor will shut an HVIL switch, and power will be supplied to all HV devices.

33 Claims, 11 Drawing Sheets

(56) References Cited

U.S. PATENT DOCUMENTS

| | | | | |
|---|---|---|---|---|
| 2011/0097925 A1* | 4/2011 | Caveney | ................ | H04Q 1/149 439/488 |
| 2014/0099808 A1* | 4/2014 | McClelland | ....... | H01R 13/6205 439/153 |
| 2014/0191030 A1* | 7/2014 | Reineccius | ............. | B60L 53/65 235/381 |
| 2020/0127451 A1* | 4/2020 | Elberbaum | ............ | G08C 23/06 |

* cited by examiner

SYSTEM AND METHOD EMPLOYING WIRELESS HIGH-VOLTAGE INTERLOCKING LOOP USING RFID-ENABLED ELECTRICAL CONNECTORS CONTAINING CONDUCTIVE MATERIAL

CROSS REFERENCE TO RELATED APPLICATIONS

The present application is a continuation-in-part of U.S. Nonprovisional Utility patent application Ser. No. 16/894,950, filed Jun. 8, 2020, and entitled, "RFID-ENABLED ELECTRICAL CONNECTOR," which is incorporated herein by reference.

FIELD OF INVENTION

This invention relates to the classification of electrically-conductive connections, and to one or more sub-classifications under means for preventing, inhibiting, or avoiding incorrect coupling. Specifically, this invention is a wireless high-voltage interlocking loop meant to detect improper electrical connections in a high-voltage circuit.

BACKGROUND OF INVENTION

Over the past several decades, the amount of electronics in in motor vehicles has increased substantially. Electronics are used to improve performance, control emissions, and provide creature comforts to the occupants and users of the motor vehicles. Motor vehicles are a challenging electrical environment due to vibration, heat, and longevity. Heat, vibration, and aging can all lead to connector failure. In fact, loose connectors, both in the assembly plant and in the field, are one of the largest failure modes for motor vehicles. Considering that just the aggregate annual accrual for warranty by all of the automotive manufacturers and their direct suppliers is estimated at between $50 billion and $150 billion, worldwide, a large failure mode in automotive is associated with a large dollar amount.

The category with the highest warranty and quality cost in automotive industry are electrical connections, specifically mis-seated electrical connections. These warranty problems are caused by an incomplete connector mating process at the vehicle assembly lines, as there are no reliable methods to assure and record/verify that an electrical connector is fully mated.

Connector design has evolved numerous features in order to address this issue. One of the most common features is Connector Position Assurance ("CPA"). A CPA feature is a secondary lock that cannot be engaged until the connector is fully seated. CPA features have not resolved the overall warranty problems, because there is no contemporaneous method, measurement, or record proving that the CPA feature is being properly installed and deployed.

Another large source of warranty related to electrical connectors in automotive involves high-power connections to alternators, batteries, power, and power junction boxes. With hybrid engines, there are even more high-power connections. The most common solution for this type of connection is the eyelet. An eyelet is a metal fitting requiring a thread fastener and nut. Although eyelets are specified as requiring a certain torque and angle during installation, there is no method, measurement, or record to prove the eyelet is being properly installed and deployed. Eyelets are being displaced because of the substantial cost of installation and the cost of warranty.

High-power/high-voltage ("HP/HV") connectors with spring-loaded actuators are displacing eyelets. There is a demand that the new HP/HV connector designs yield recordable proof that they have been correctly installed. Such records do not currently exist.

The industry currently uses sub-standard solutions for recording installation. For example, barcodes are used with CPA features. The barcode is placed in a position in which it can only be read when the CPA is fully seated. Unfortunately, this method only works if an open area exists around the CPA, so that a barcode reader can access the barcode. In most of cases such space is not available and this method is not complete solution for connector assembly process. Moreover, this method of error-proofing is expensive, as an employee is usually used to read the bar-code.

The problem with electrical connectors is exacerbated in a high-voltage environment, such as those present in electric and hybrid-electric vehicles (hereinafter "electric vehicles"). Electric vehicles have many high-voltage parts that are not found in traditional vehicles using solely internal combustion engines. Electric vehicles typically have components such as inverters, dc-dc converters, electric motors, and high-voltage junction boxes.

In order to prevent problems associated primarily with poor electrical connections, manufacturers of electric vehicles have designed an electrical architecture referred to as a high-voltage interlock(ing) loop ("HVIL"). The HVIL ensures that the high-voltage ("HV") circuit is closed and insulated from the environment. The HVIL ties together all of the HV devices such as inverters, dc-dc converters, electric motors, and high-voltage junction boxes. The HVIL monitors the current and voltage, opening the circuit when a fault is detected. This disconnects the HV power supply from the HV components. If the HVIL detects a fault with any of the high-voltage components, power is cut to all of the high-voltage components.

The HVIL circuit is usually implemented as a dedicated circuit, with a dedicated processor, an HVIL switch connected to a pair of HVIL wires running between each HV device. The HVIL circuit adds cost and complexity to the overall wiring system. The HVIL requires HV connectors, HVIL wires, an HVIL processor, and an HVIL switch. The HVIL connectors, themselves, are subject to the same potential failure modes as those faced by all other automotive connectors. The most common type of fault with a high-voltage component is a connector fault. Auto manufacturers have attempted to address connector problems with high-voltage components using connects with CPA. This effort has met the same frustrations as those found when using a CPA on a regular, low-voltage connector.

The automotive market has a need for a wireless HVIL circuit using RFID-enabled CPA connectors to cheaply and reliably detect faults in HV components and their connectors. The CPA connectors would contain conductive material that will block RFID transmission in the event that the connector is mis-assembled.

SUMMARY OF THE INVENTION

This summary is intended to disclose the present invention, a wireless HVIL using RFID-enabled Electrical Connectors Containing Conductive Material. The embodiments and descriptions are used to illustrate the invention and its utility and are not intended to limit the invention or its use.

In the illustrated embodiments, the RFID-enabled electrical connector is embedded in a CPA feature. Conductive materials are used in the fabrication of the electrical connector so that the RFID chip cannot transmit its signal if the connector is not completely connected with the CPA feature properly enabled. These conductive materials can include conductive polymers. The conductive materials can also be metal foils used to metalize certain parts of a molded connector.

RFID, or radio-frequency identification, uses electromagnetic fields generated by an RFID reader to automatically identify an object with an RFID tag. An RFID tag consists of a miniature radio transmitter and receiver on which is stored a unique string of digital data. The RFID reader transmits a digital pulse which causes the RFID tag to transmit its string of digital data in response. The RFID reader has an effective range, beyond which it cannot reliably read RFID tags. This string of digital data is usually interpreted as an inventory control number, serial number, or other unique alphanumeric code. An RFID tag can be either passive or active. A passive RFID tag is momentarily energized by the pulse from the RFID reader, causing the passive RFID tag to transmit its string of digital data. An active RFID tag is powered by an onboard battery, which will give it superior transmission range. Unlike a barcode, an RFID tag does not need to be within the line of sight of the reader, so it may be embedded in a tracked object.

An electrical connector will typically have a plug or male portion and a socket or female portion. In connectors with a CPA feature, the CPA feature is typically included in the socket. The plug is first fully inserted into the socket, engaging the CPA feature. This usually creates an initial "click" indicating that the housing of the plug has engaged an inbound connector tab on the CPA feature of the socket. When the inbound connector tab engages, it enables an outbound connector tab. The plug of the connector is then partially pulled out of the socket of the connector, creating a second "click" indicating that the outbound connector tab has locked the plug into position with respect to the socket.

The system of the present invention uses a plurality of HV devices, each HV device having a wireless HVIL electrical connector; an RFID tag reader; an HVIL switch; an HVIL processor; a non-transitory, computer-readable HVIL memory element; and an HV power supply having a wireless HVIL connector. As used in this application, the wireless HVIL connector does not mean that the connector has no wires. Rather, the connector does not have wires running in a dedicated HVIL circuit. The HVIL functionality is handled wirelessly. Each wireless HVIL connector contains an RFID tag embedded in a CPA feature. At least part of each connector housing is fabricated from a conductive material, such as a conductive polymer resin. Although metalized plastic can also be used, the conductive polymer works best. A metalized plastic is a metal foil inserted into a plastic mold during fabrication. The result is a conductive, metallized layer that is embedded in the plastic.

When the RFID tag is covered by the conductive material, it is shielded, and cannot be detected by an RFID tag reader. When the RFID is shielded by the conductive material, the RFID reader cannot energize the RFID tag, because the RFID signal cannot reach the RFID antenna. When the RFID-enabled Electrical Connector is improperly installed, the CPA feature is not properly seated and conductive material covers the RFID tag. This prevents the RFID reader from reading the RFID tag. When the RFID-enabled Electrical Connector is properly installed, the proper seating of the CPA feature exposes the RFID tag, allowing the RFID tag to be read by the RFID reader.

The wireless HVIL system is usually architected as an HVIL control box; an HV power supply; and a plurality of HV devices, wherein each of the HV power supply and the plurality of HV devices has an RFID-enabled electrical connector with CPA functionality. The HVIL control box contains the RFID reader, the HVIL processor, the non-transitory, computer-readable HVIL memory element, and the HVIL switch.

In use, the wireless HVIL system is embedded in a product such as a vehicle. The non-transitory, computer-readable HVIL memory element stores the unique RFID tag identifier for each of the plurality of HV devices within the wireless HVIL circuit. When the power to the vehicle is cycled on, the RFID reader emits a digital pulse, causing each RFID tag to transmit its unique RFID tag identifier. The RFID reader receives each of the unique RFID tag identifiers and communicates them to the processor. The processor compares the received unique RFID tag identifiers to the list of unique RFID tag identifiers contained in the non-transitory, computer-readable HVIL memory element. When the processor identifies that the RFID reader has received every unique RFID tag identifier contained in the non-transitory, computer-readable memory element, the HVIL processor closes the HVIL switch and HV power flows through the HV circuit. If the RFID reader fails to detect even a single RFID tag number, the processor will not close the HVIL switch and no HV power will flow through the circuit. The HVIL processor will instruct the RFID reader to make repeated attempts to receive all of the unique RFID tag identifiers. After a pre-defined number of failed attempts, the HVIL processor will transmit an error message so that the user will know that a fault exists in the system, which will typically be given on a display to the user.

In this example, the RFID tag is embedded in the housing of an HV plug used to connect the plurality of HV devices. The socket is attached to an HV device, such as an inverter. When the HVIL switch is closed, HV power from the HV power supply will flow to the HV device. Each socket has conductive material that covers the RFID tag when the plug is fully inserted into the socket. When the plug is partially retracted from the socket, locking the outbound tab of the CPA in place, the RFID tag is exposed, allowing the RFID reader in the HVIL processor to read the RFID tag belonging to the inverter. The conductive material is preferably a conductive polymer, although the invention works with metallized plastic, as well.

In one alternative embodiment, the HVIL control box can be embedded in the HV power supply. The remainder of the system would operate as discussed above.

In another alternative embodiment, the HVIL control box is additionally comprised of its own active RFID tag with a unique identifier. The HV power supply has an embedded RFID reader, processor, and system switch. When the HVIL processor verifies that all of the HV devices are properly installed, the HVIL processor closes a switch to the RFID tag, causing the active RFID tag to transmit its unique identifier to the power supply. The RFID reader of the power supply receives the unique RFID sequence from the HVIL processor and the processor of the power supply closes the system power switch, giving power to the system. Although this embodiment is more complex, it may have advantages to current automotive assembly and repair practice.

For each of the wireless HVIL connectors, the RFID tag is overmolded into the housing of the connector plug during fabrication of the plug. The housing of the plug is made of non-conductive polymers. Alternately, the RFID tag can be printed on the plug during fabrication of the plug. Ideally, the RFID tag is placed within a cavity or well in the plug housing. This allows the CPA feature to better cover the RFID tag when the connector has not been properly seated. The back of the RFID tag can be plated to prevent signal from leaking through the plug housing and energizing the RFID tag from the back. If needed, the cavity on the plug housing containing the RFID tag can be over-molded with conductive plastic to prevent signal from the RFID reader from reaching the RFID tag from the sides.

Alternately, to improve overall noise immunity for the plurality of RFID tags and the at least one RFID reader, a 5-sided box made of conductive plastic material or other conductive material can be fabricated. The RFID tag is placed in the 5-sided shielded box. The 5-side shielded box is then placed in the cavity on the plug housing.

BRIEF DESCRIPTION OF THE DRAWINGS

The present invention is illustrated with 14 drawings on 11 sheets.

DETAILED DESCRIPTION OF THE DRAWINGS

The following descriptions are not meant to limit the invention, but rather to add to the summary of invention, and illustrate the present invention, by offering and illustrating various embodiments of the present invention, a system and method for a wireless HVIL 601 using RFID-enabled Electrical Connectors 1. While embodiments of the invention are illustrated and described, the embodiments herein do not represent all possible forms of the invention. Rather, the descriptions, illustrations, and embodiments are intended to teach and inform one skilled in the art without limiting the scope of the invention.

Figure 8:
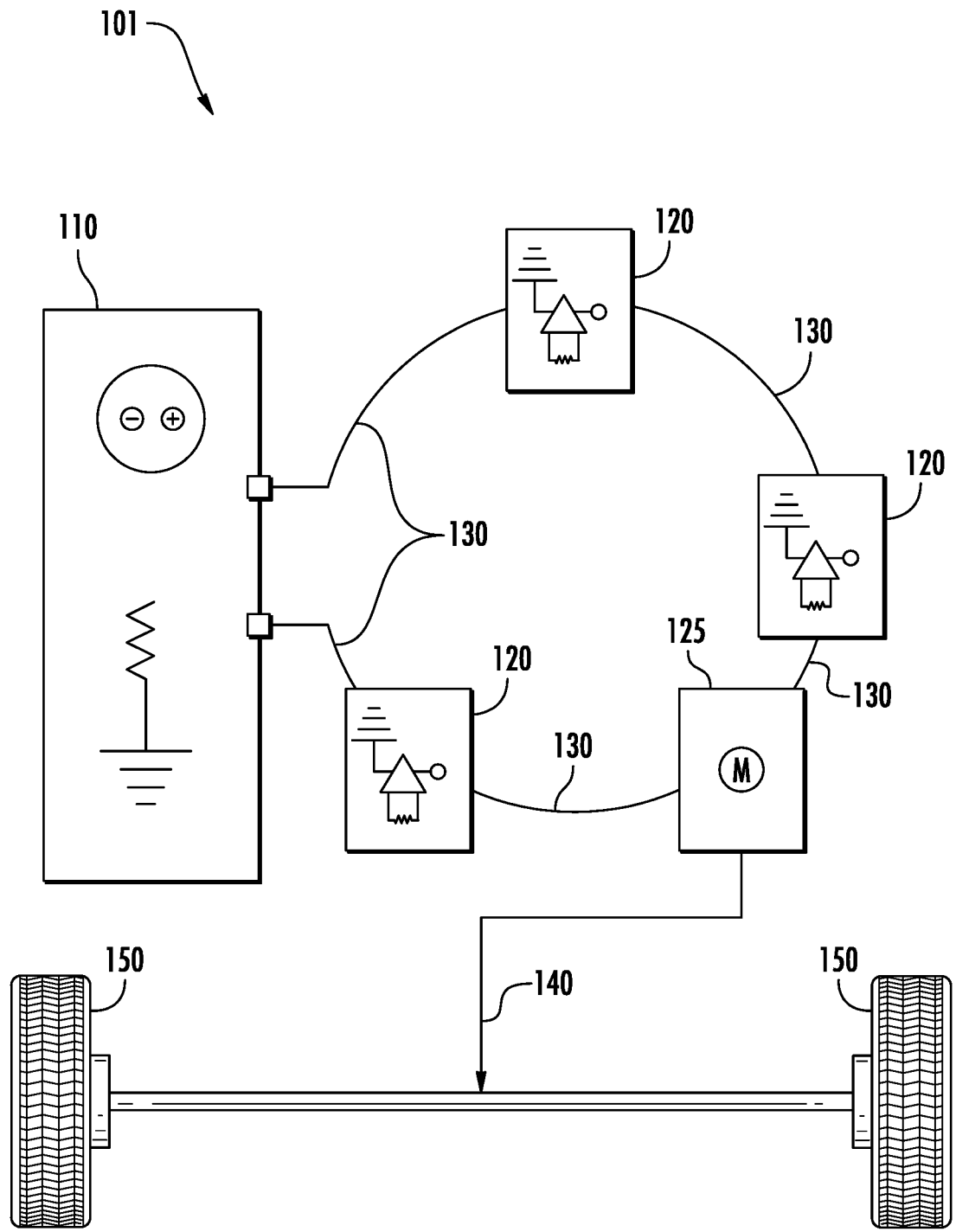
FIG. 8 is a diagram of a traditional, wired, HVIL in an automobile.
Figure 9:
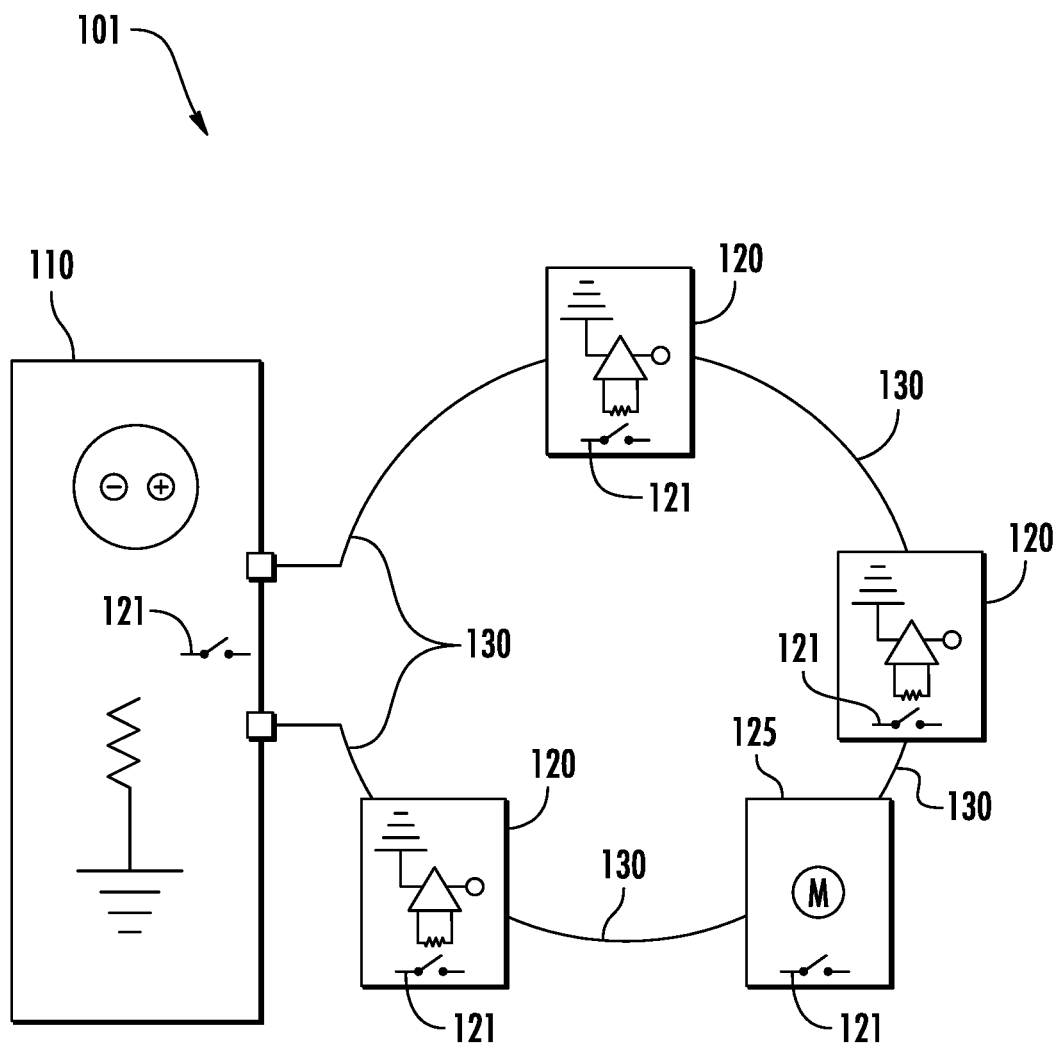
FIG. 9 is a diagram of a traditional, wired, HVIL in which a switch disabling the HVIL is present in each device.
Figure 10:
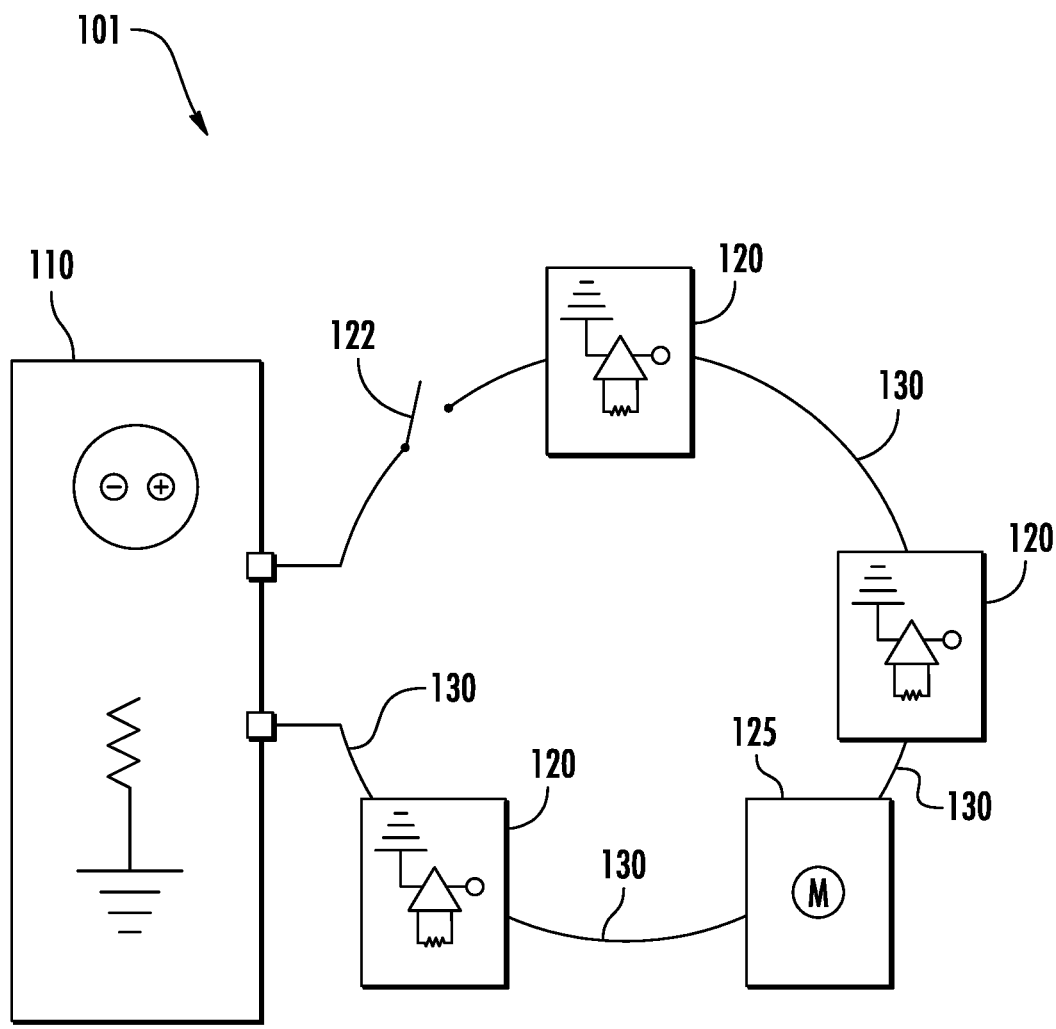
FIG. 10 is a diagram of a traditional, wired, HVIL with a single system switch to disable the power.

FIGS. 8-10 show various embodiments of the current state-of-the-art wired high-voltage interlocking loop ("HVIL") 101. FIG. 8 shows a wired HVIL 101 used in a vehicle. The HVIL 101 is comprised of a high-voltage ("HV") power supply 110, a plurality of HV devices 120, an HV motor 125, and wired loop 130 connecting all of the components. The wired loop 130 of an HVIL is a separate wired loop from any power loop connecting each device requiring power 120, 125 to the power supply 110. The HV motor 125 has a drive 140 to the drive train 150 of the vehicle. In electric and hybrid-electric vehicles, there are a number of HV devices 120 such as inverters, dc-dc converters, and HV junction boxes.

The HVIL 101 is not the power distribution for the system, meaning it is not delivering HV power to each of the plurality of HV devices and the HV motor. To be clear, the HV motor 125 is an HV device 120. Rather, it is a separate wired loop 130 intended to detect if any of the HV components has a faulty connection.

FIG. 9 shows one embodiment 101 of the HVIL 101. In this embodiment, there is a switch 121 in the HV power supply 110, each of the plurality of HV devices 120, and the HV motor 125. If a device 110, 120, 125 on the HVIL loop wire 130 has a faulty connection, its switch 121 will open, signaling to the HVIL 101 that there is a system fault. This will lead to the HV power being cut to all devices 120, 125.

FIG. 10 shows an alternative embodiment 101 for the wired HVIL 101. In this embodiment, there is a single system switch 122 connected in series with the wired loop 130 that opens if a fault is sensed in the connection of any of the HV devices 120, the HV motor 125, or the HV power supply 110. The single system switch 122 cuts HV power to all devices 120, 125.

Before explaining the overall wireless HVIL system 601 of the present invention 601, it is necessary to disclose and teach one of its core components, an RFID-enabled Electrical Connector 1. The overall system 601 uses a plurality of the RFID-enabled Electrical Connectors 1. The RFID-enabled Electrical Connectors 1 use a conductive material; preferably, the conductive material is a conductive polymer.

Figure 1:
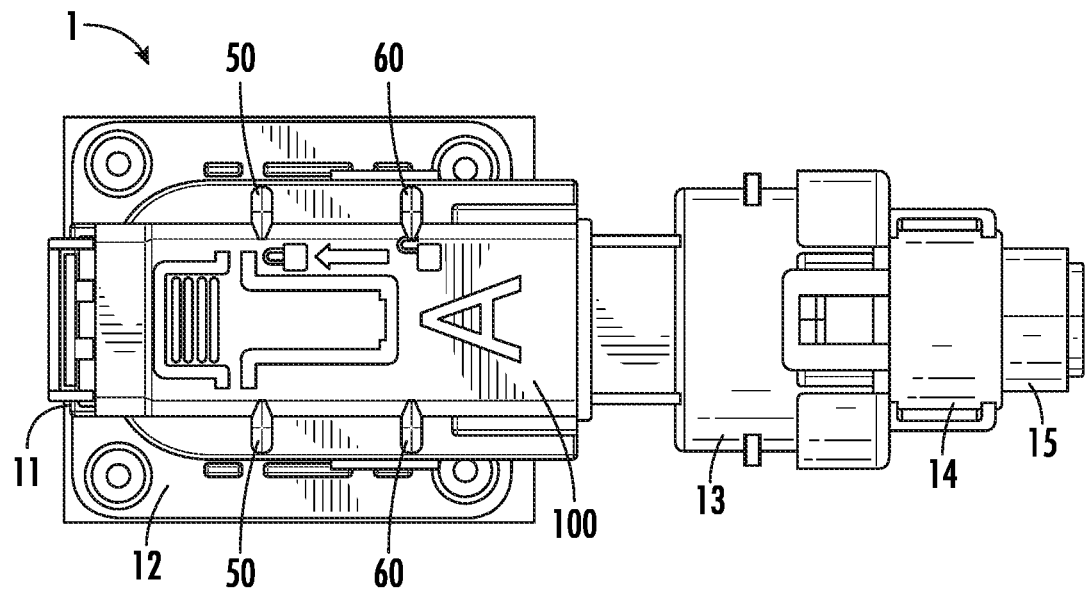
FIG. 1 is a top view of an RFID-enabled Electrical Connector showing the terminal plug fully inserted into a socket with a CPA feature.
Figure 2:
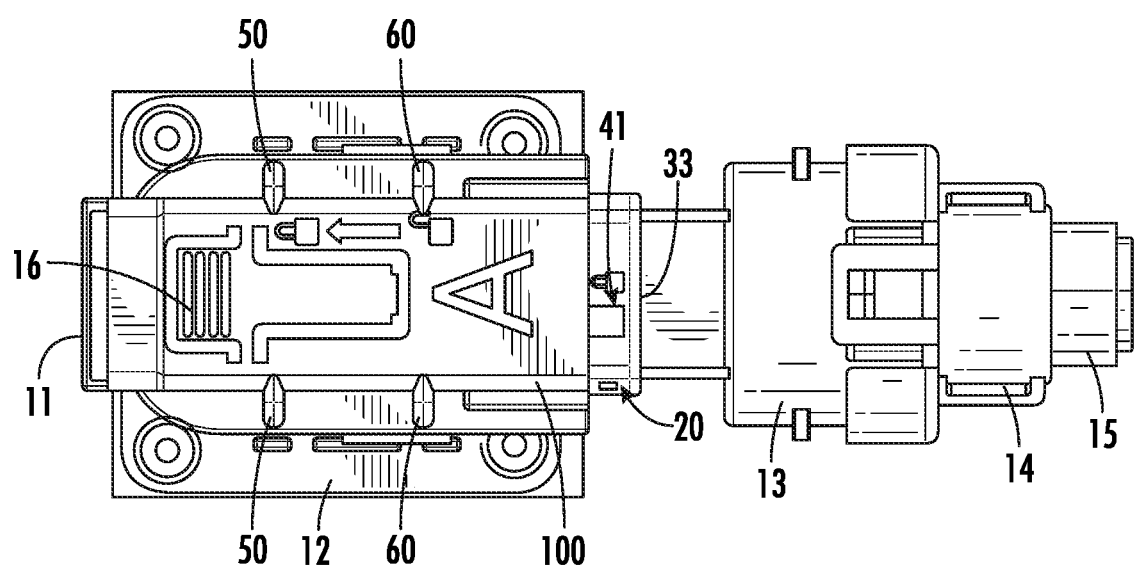
FIG. 2 is a top view of an RFID-enabled Electrical Connector showing the terminal plug retracted from the socket with the CPA feature, so that the CPA feature is fully engaged.
Figure 3:
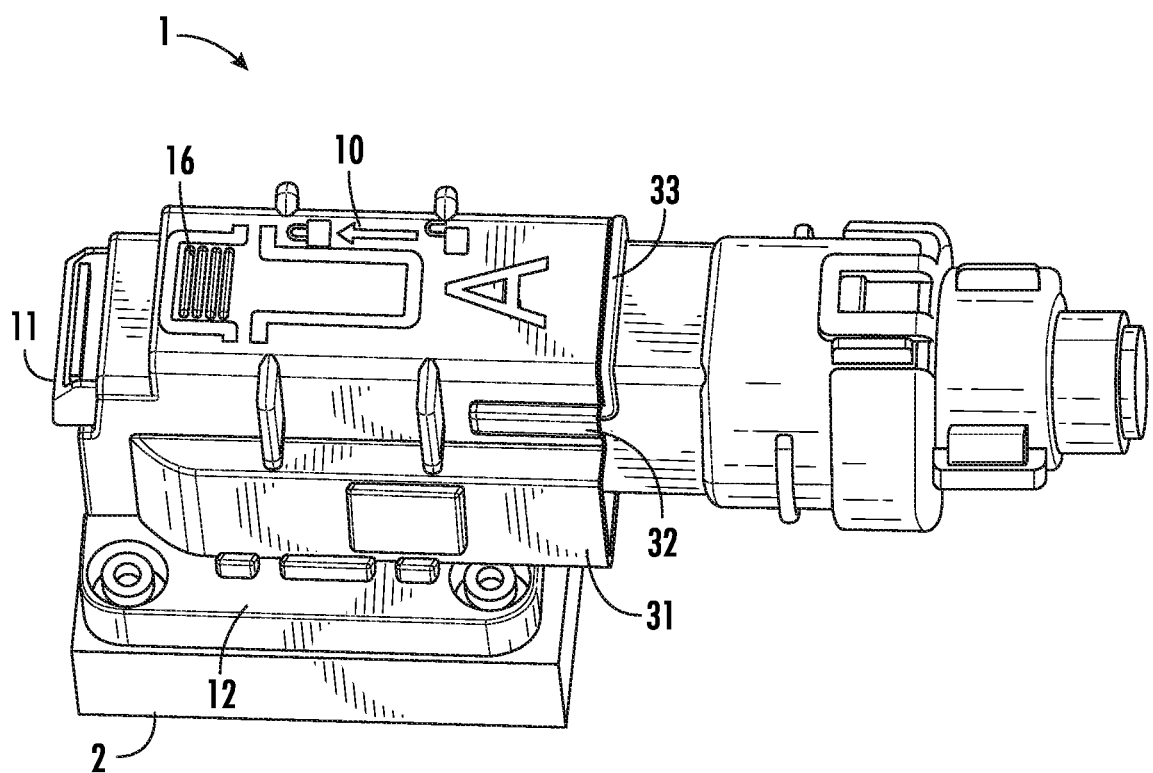
FIG. 3 is a perspective view of an RFID-enabled Electrical Connector showing a terminal plug fully inserted into a socket with a CPA feature.
Figure 4:
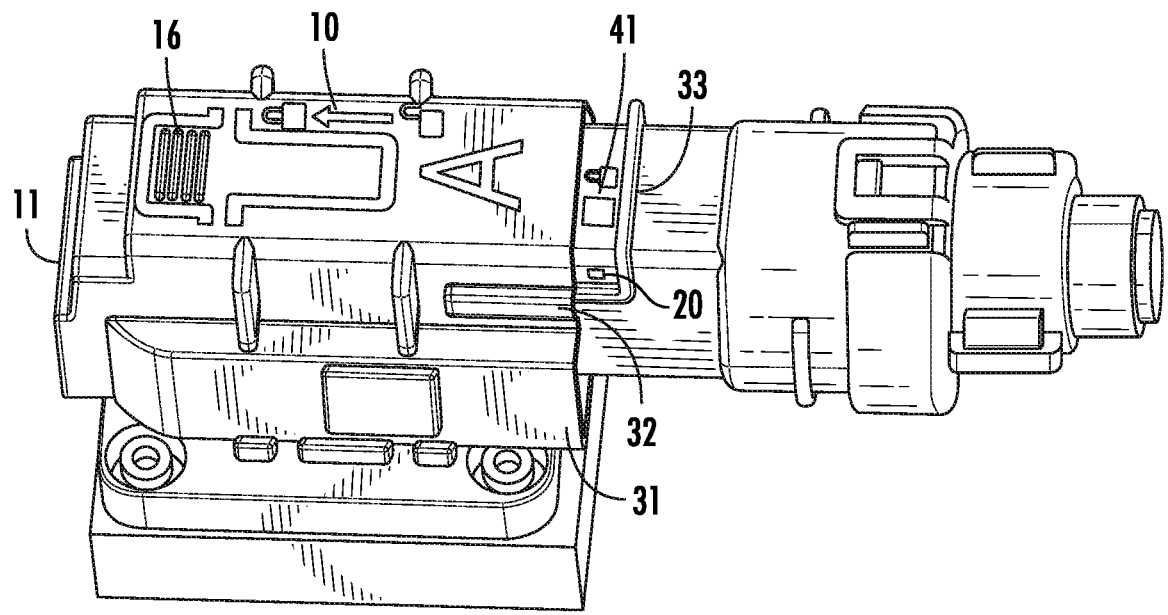
FIG. 4 is a perspective view of an RFID-enabled Electrical Connector showing a terminal plug retracted from the socket with the CPA feature, so that the CPA feature is fully engaged.

FIGS. 1-4 show the RFID-enabled Electrical Connector 1. The RFID-enabled Electrical Connector 1 has Connector Position Assurance ("CPA") features. FIGS. 1 and 3 show the CPA feature unlocked. FIGS. 2 and 4 show the CPA feature locked. The RFID-enabled Electrical Connector 1 has a socket 31, a connector housing 13, and a plug 14. The plug 14 is connected directly to a high-voltage electrical supply wire 15.

The socket 31 has a number of CPA features: a latch 11, a release 16, a first lock indicator tabs 60, a second lock indicator tabs 50, a CPA lock tab 41, and a visual indicator 10. The socket 31 also has a mating ridge 32 to accept a portion of the ridge 33 on the connector housing 13. The socket 31 has a base 12 that interfaces with a circuit-board 2, or a similar electrical interface.

The connector housing 13 is mated with the plug 14. The connector housing 13 is then inserted into the socket 31. The direction of insertion is indicated 10. The connector housing 13 encounters resistance when it hits the first lock indicator tab 60, indicating that there is an internal locking tab that the insertion force must overcome. The connector housing 13 then encounters resistance when it hits the second lock indicator tab 50, indicating that there is a second internal locking tab that the insertion force must overcome. When the connector housing 13 is fully inserted into the socket 31, the latch is exposed 11. A ridge 33 on the connector housing 13 also acts as a stop. The ridge 33 also acts as a guide that inserts in a mating ridge 32 on the socket housing 100.

Once the connector housing 13 is fully inserted into the socket 31, the latch must be pressed, which causes the connector housing 13 to retract slightly with respect to the socket 31. This means that the CPA features 11, 16, 60, 50, 41, and 10 have been properly deployed. The connector housing 13 is positionally locked with respect to the socket 31 when the CPA features 11, 16, 60, 50, 41, and 10 have been properly deployed. In the fully inserted position, prior to the latch 11 being pressed, the connector housing 13 is not positionally locked with respect to the socket 31. In other words, the CPA features 11, 16, 60, 50, 41, and 10 have not properly deployed. In the fully inserted position, prior to the latch 11 being pressed, the connector housing 13 is in full electrical contact with the socket 31, which is the state that allows the latch 11 to be exposed. Of course, CPA connector systems can be accomplished with variations of the above. The problem with current CPA connector systems is that there is no way to assure that the CPA features 11, 16, 60, 50, 41, and 10 have been properly deployed and that the connector housing 13 is positionally locked with respect to the socket 31.

Figure 5:
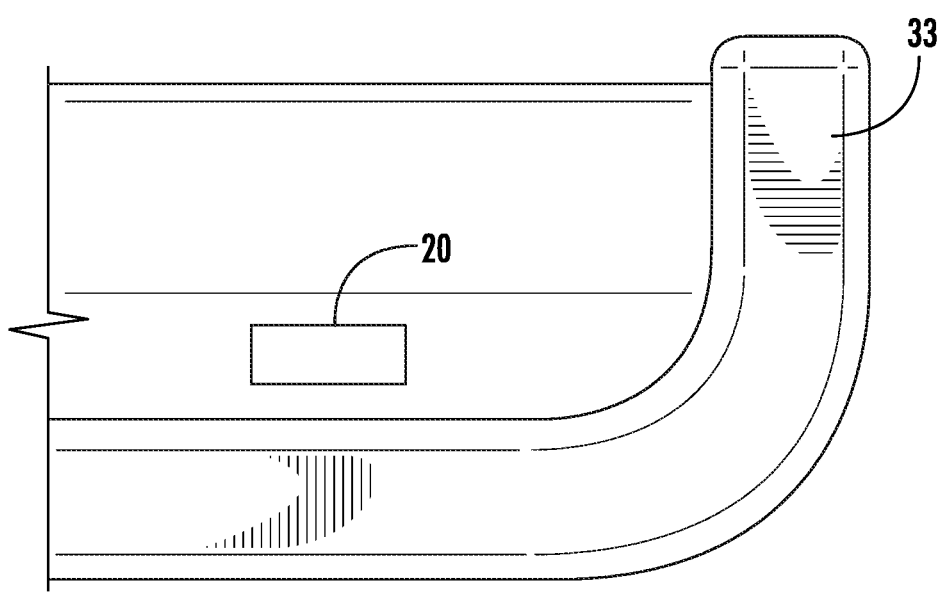
FIG. 5 is a close-up isolation view of an RFID tag embedded on a connector housing ridge.

The present invention 1 builds on the prior art by adding an RFID tag 20, which can be read by an RFID reader only when the CPA features 11, 16, 60, 50, 41, and 10 have been properly deployed and that the connector housing 13 is positionally locked with respect to the socket 31. An RFID tag 20 is typically a three-dimensional right rectangle with six sides. The RFID tag 20 is affixed in some manner to one of the components of the RFID-enabled electrical connector 1. In this embodiment, a passive RFID tag 20 is shown in FIGS. 2 and 4 as being embedded within the connector housing 13 ridge 33. The socket housing 100 is fabricated from an electrically conductive material, such as an electrically conductive polymer. When the connector housing 31 has been fully inserted into the socket 31, exposing the latch 11, as shown in FIGS. 1 and 3, the electrically conductive polymer of the socket housing 100 shields the RFID tag 20, obscuring it from an RFID reader. In other words, the electrically conductive material shields the RFID tag 20 from the radio frequency signals of the RFID reader. FIG. 5 is an isolated close-up of the RFID tag 20 embedded on the ridge 33 of the connector housing 13. An RFID reader would be unable to energize the RFID tag 20 in this position. Once the latch 11 is pressed, forcing the connector housing 13 to partially retract from the socket 31, the RFID tag 20 is exposed, as shown in FIGS. 2 and 4. In this state, an RFID reader would be able to easily energize the RFID tag 20, and read its identifying information. This would give positive confirmation that the RFID-enabled electrical connector 1 is in its proper position, with proper electrical connection being made.

Depending on the frequencies used by the RFID tag 20 and the field strength of the RFID reader, leakage is possible. In order to prevent stray leakage, potentially resulting in a false reading, the connector housing 13 may also be fabricated from an electrically conductive material, such an electrically conductive polymer. The conductive materials can also be metalized plastic, in which metal foils are embedded in certain features of the connector during the molding process. In an alternative embodiment, the connector housing 13 can be fabricated from traditional connector housing polymers, and just the ridge 33 can be formed from an electrically conductive material, such as an electrically conductive polymer. In this embodiment, the ridge 33 formed from an electrically conductive polymer surrounds the RFID tag 20 on five sides. Only the top surface of the RFID tag 20 is exposed. Functionally, the RFID tag 20 is in a five-sided box constructed within the ridge 33. As a further embodiment to the present invention 1, the RFID tag 20 may be contained in a dedicated five-sided box fabricated from electrically conductive polymer.

Figure 6:
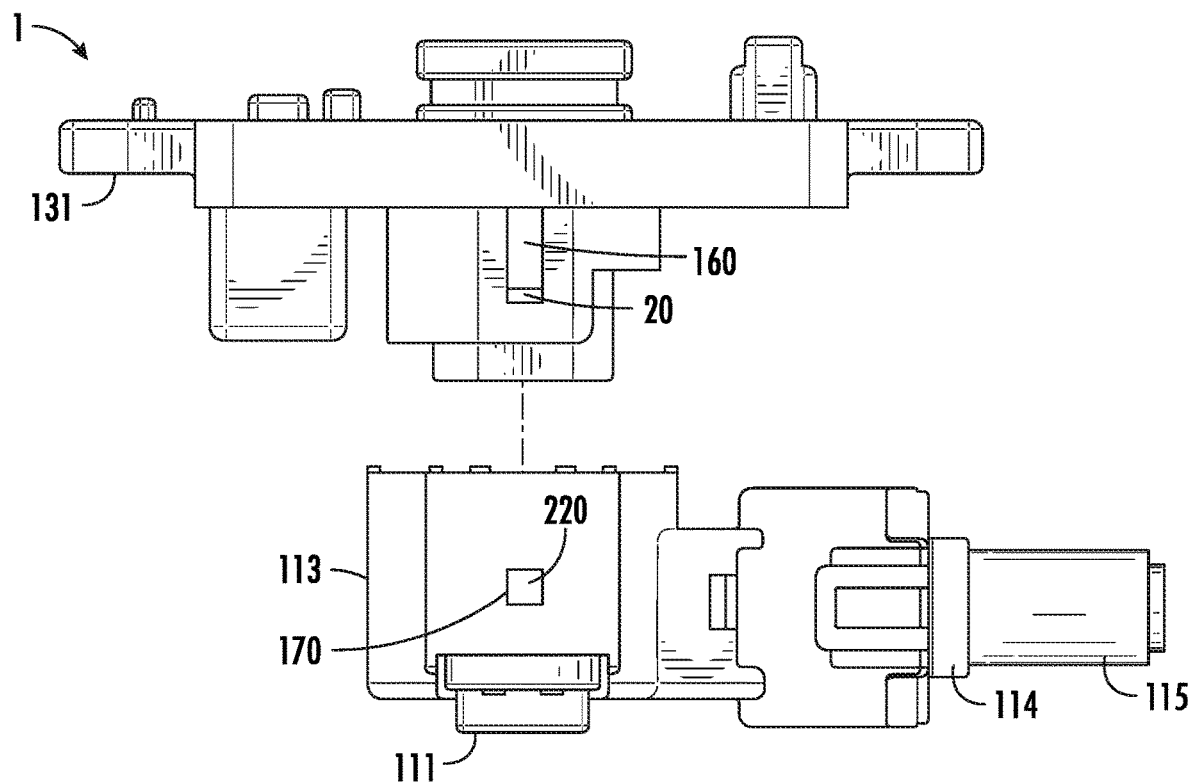
FIG. 6 is a front view of an alternative embodiment of an RFID-enabled Electrical Connector with a CPA feature, with the socket and connector housing unattached.
Figure 7:
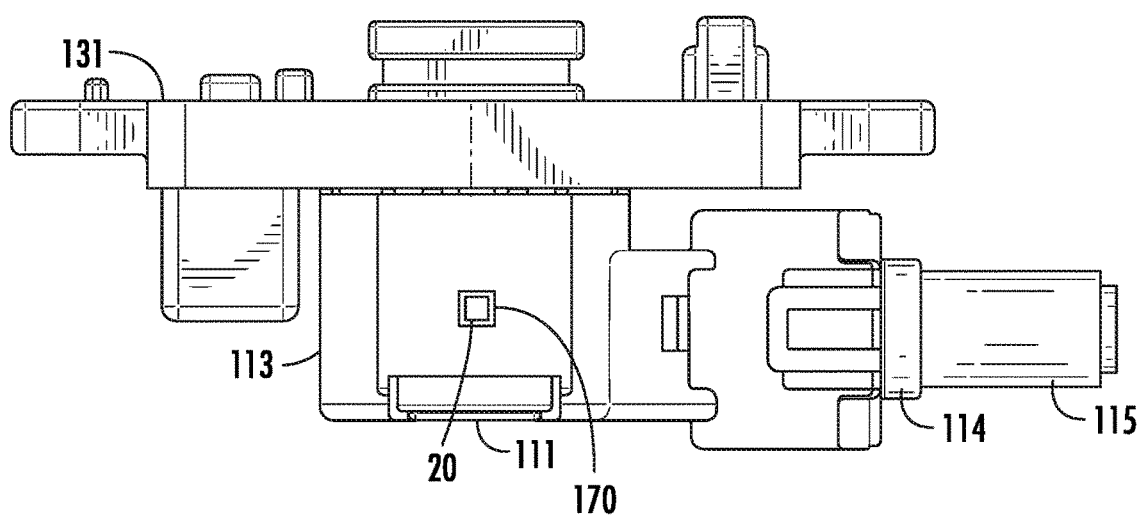
FIG. 7 is a front view of an alternative embodiment of an RFID-enabled Electrical Connector with a CPA feature, with the socket and connector housing attached.

FIGS. 6 and 7 show the same invention 1 implemented on a different type of connector with CPA. A socket 131 that inserts into a connector housing 113 is shown. The socket 131 has a locking tab 160, below which is affixed an RFID tag 20. The RFID tag 20 can be affixed to the socket 131 by being printed on the socket 131, being glued to the socket 131, or being embedded into the socket 131 during molding. The connector housing 113 is attached to a plug 114, which in turn, is connected directly to a high-voltage electrical supply wire 115. In this embodiment, the socket 131 is inserted into the connector housing 113. When the socket 131 is properly inserted into the connector housing 113, a CPA latch 111 is enabled. When the CPA latch 111 is depressed, the socket 131 and connector housing 113 are correctly positioned and locked into place.

The connector housing 113 is made from an electrically conductive material, such as an electrically conductive polymer. The connector housing 113 has an RFID window 170. There is a void 220 in the center of the RFID window 170. When the socket 131 is properly seated in the connector housing 113, and the CPA latch 111 has been depressed (compare FIG. 6 to FIG. 7), the RFID-enabled connector 1 is properly attached, and the RFID tag 20 can be read through the RFID window 170. When the CPA features of this connector have not been properly deployed, the RFID tag will be obscured from an RFID reader by the electrically conductive material of the connector housing 113.

In FIG. 7, the RFID-enabled connector 1 is properly mated. The RFID tag 20 attached to the socket 131 is positioned within the RFID window 170 of the connector housing 131. The void 220 in the electrically conductive material of the connector housing 113 allows the RFID tag 20 to be energized and read by an RFID reader.

Figure 11:
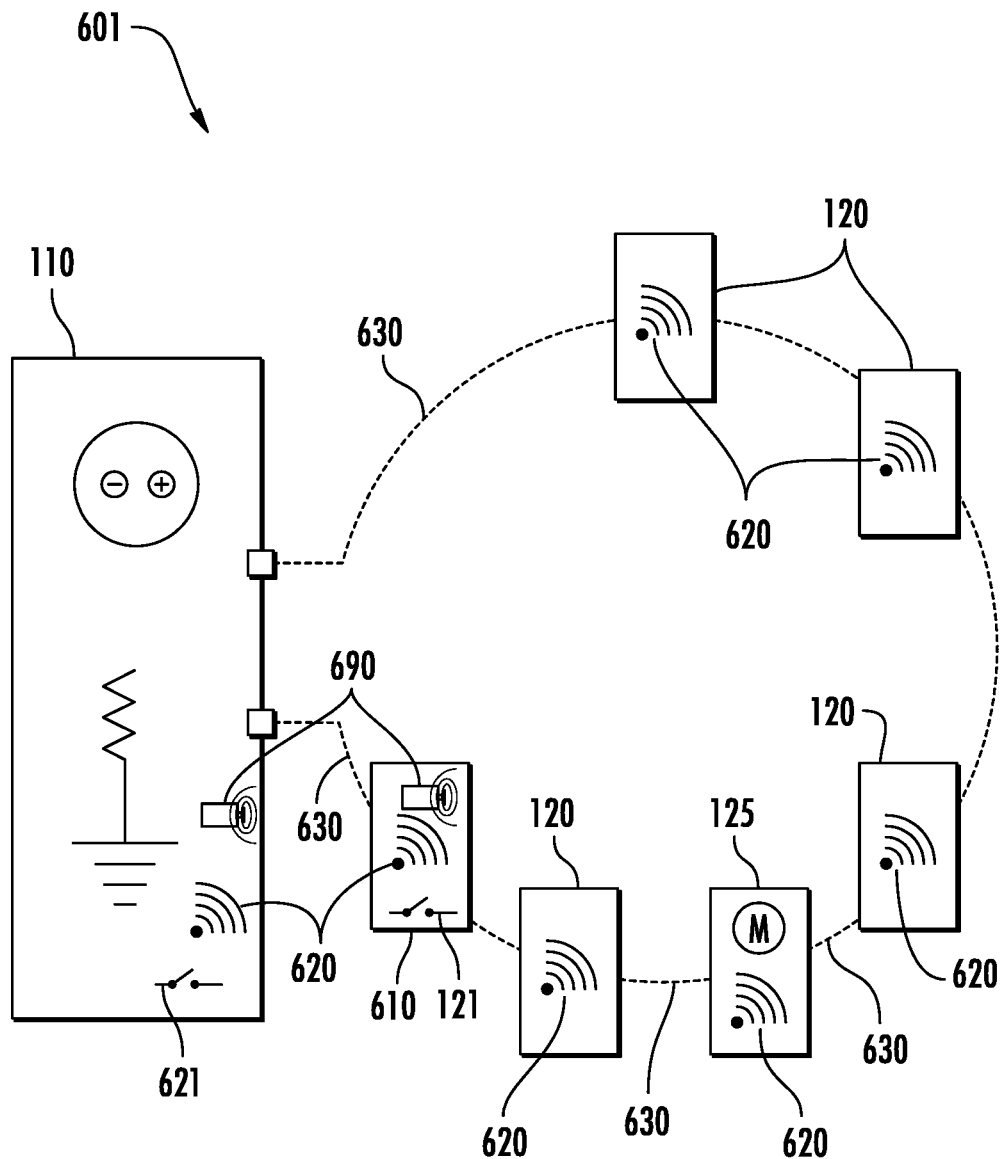
FIG. 11 is a first embodiment of the present invention, a wireless HVIL using RFID-enabled electrical connectors.
Figure 13:
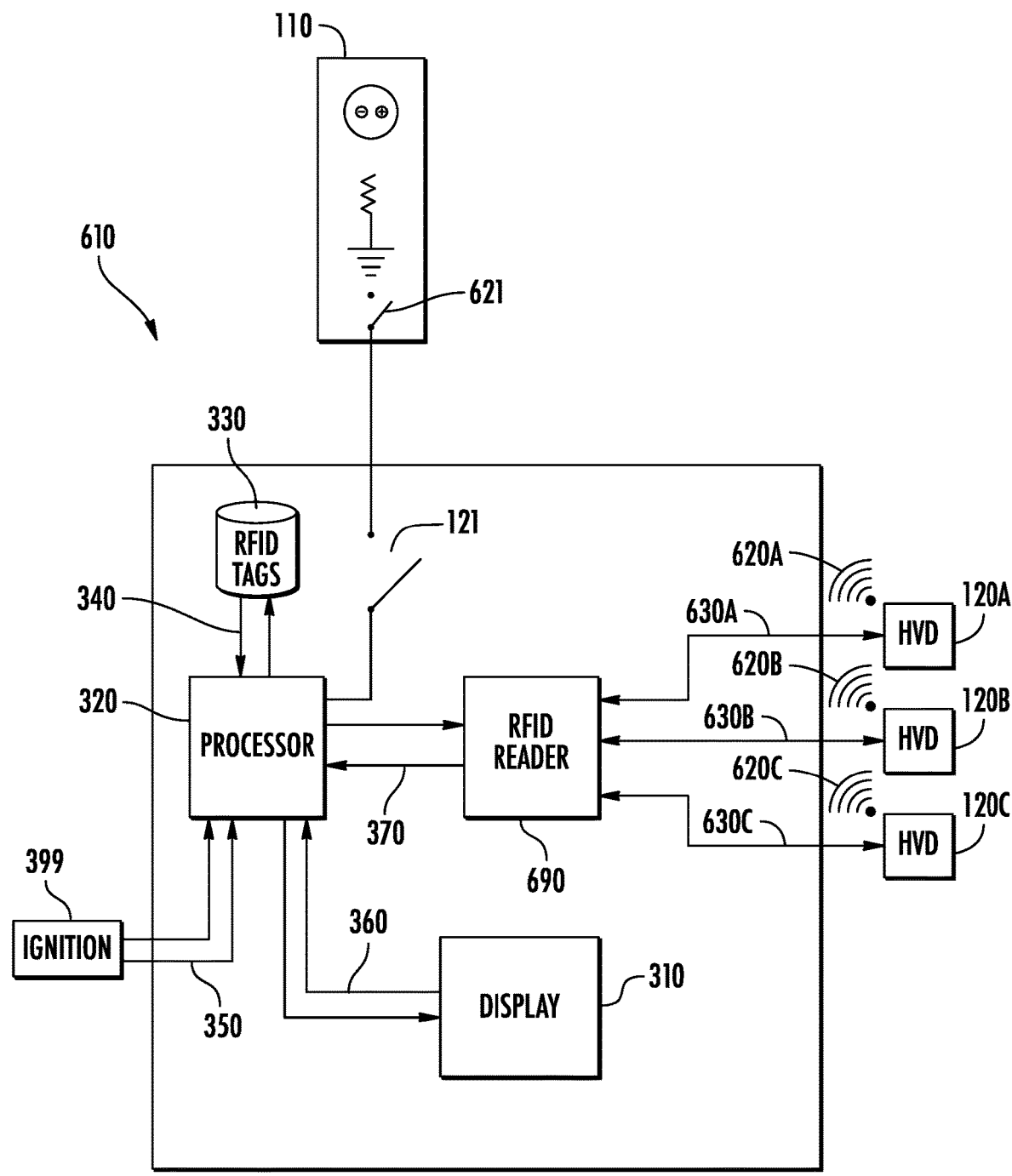
FIG. 13 is a system architecture of a first embodiment of the present invention, a wireless HVIL using RFID-enabled electrical connectors.

FIG. 11 shows an embodiment of the present invention 601, a wireless HVIL 601 using RFID-enabled Electrical Connectors 1. In this figure, there are familiar components in common with the wired HVIL 101; a power supply 110, a plurality of HV devices 120, and a HV motor 125. Each of the plurality of HV devices 120 has a RFID tag 620 embedded in its RFID-enabled Electrical Connector. Additionally, the HV motor 125 has a RFID tag 620 embedded in its Electrical Connector. Each of the plurality of RFID tags 620 has its own unique identifier. The HV power supply 110 has an RFID reader 690 and an RFID-enabled Electrical Connector 1 with an RFID tag 620. An HVIL control box 610 completes the wireless circuit 630. The HVIL control box 610 has an RFID reader 690 and an RFID tag 620. The at least one RFID readers 690 have an effective range, beyond which they cannot reliably read an RFID tag. Additional components of the HVIL control box 610 are shown in FIG. 13. The RFID tag 620 embedded in the RFID-enabled Electrical Connector 1 of each of the HV power supply 110, the HV motor 125, and HV devices 120 can transmit its unique identifier only when the CPA features of the RFID-enabled Electrical Connector 1 are properly deployed. It is of course possible to place additional RFID readers 690 in other places throughout the wireless HVIL circuit 601 in order to maximize coverage. When power is cycled on, the RFID tag 620 of every properly installed RFID-enabled Electrical Connector 1 is readable by one or more of the RFID readers 690. There can be a single RFID reader 690 or distributed RFID readers 690.

In FIG. 11, the wireless circuit 630 is represented in a circle. This is not a limitation of the circuit, it is merely intended as an effective way of showing that the tangible wired loop 130 that previously existed in a wired HVIL 101 can be replaced by a wireless circuit 630 in a wireless HVIL 601. With RFID-enabled Electrical Connectors 1, RF transmission can occur in any direction.

However, this wireless loop 630 is illustrative on one alternative embodiment. The RFID readers 690 can be distributed to each HV device in the system 110, 610, 120, 125. The distributed RFID readers 690 would then be wirelessly daisy-chained with RFID tags 620. This means that the RFID readers 690 can be distributed to the HV devices as a wireless serial connection, requiring each RFID reader 690 to detect the RFID tag 620 that precedes it in the chain 630.

FIG. 13 shows additional detail of the HVIL control box 610. The HVIL control box 610 has an RFID reader 690, a switch 121, a processor 320, a non-transitory computer-readable HVIL memory element 330, and a display 310. As shown in FIG. 13, the display 310 is part of the HVIL control box 610, however, it should be understood by one skilled in the arts that the display 310 may just as easily be rendered external to the HVIL control box 610. The processor 320 can display 360 information on the display 310. The processor 320 can access 340 the non-transitory computer-readable HVIL memory element 330. The non-transitory, computer-readable HVIL memory element 330 contains a list of all of the unique RFID tag identifiers 620A, 620B, 620C in the wireless RFID system 601. The processor 320 can access 370 the RFID reader 690. The RFID reader 690 can detect the RFID tags 620A, 620B, 620C of the HV devices 120A, 120B, 120C that are transmitted over the wireless HVIL via the air 630A, 630B, 630C. The HVIL control box 610 is connected to the HV power supply 110. The HV power supply 110 has a system switch 621 that kills the power to all components 120, 125.

When the vehicle ignition 399 is cycled on, the power 350 to the HVIL Control box 610 is cycled on. The RFID reader 690 emits a digital pulse and detects the unique RFID identifier 620A, 620B, 620C from each of a plurality of HV devices 120A, 120B, 120C. As discussed in conjunction with FIGS. 1-4, the RFID tag 20 of the RFID-enabled Electrical Connector 1 can only be read by an RFID reader 690 only when the CPA features 11, 16, 60, 50, 41, and 10 have been properly deployed, verifying that the connector housing 13 is positionally locked with respect to the socket 31. The unique RFID identifier 620A, 620B, 620C are only available if the CPA features are properly deployed for each RFID-enabled Electrical Connector 1 of each HV device 120A, 120B, 120C. The processor 320 compares the RFID identifiers 620A, 620B, 620C detected by the RFID reader 690 with the RFID identifiers stored in the list on the non-transitory computer-readable HVIL memory element 330. If all of the unique RFID identifiers 620A, 620B, 620C are detected, the processor 320 closes the HVIL switch 121 indicating to the power supply 110 to close the system switch 621, energizing the HV power circuit.

If the RFID reader 690 fails to detect one or more of the unique RFID identifiers 620A, 620B, 620C, the processor 320 can direct the RFID reader 690 to emit an additional digital pulse and attempt to detect all of the unique RFID identifiers again. The processor 320 again compares the RFID identifiers 620A, 620B, 620C detected by the RFID reader 690 with the RFID identifiers stored in the list on the non-transitory computer-readable HVIL memory element 330. If all of the unique RFID identifiers 620A, 620B, 620C are detected, the processor 320 closes the HVIL switch 121 indicating to the power supply 110 to close the system switch 621, energizing the HV power circuit. This process can be repeated until the number of attempts reaches a pre-defined threshold, at which point the processor sends an error message 360 to the display 310. The error message 360 can indicate in which of the plurality of HV devices 120A, 120B, 120C the fault was detected. This would of course be the HV device or devices 120A, 120B, 120C for which the RFID reader 690 was unable to read the unique RFID identifiers 620A, 620B, 620C.

Figure 12:
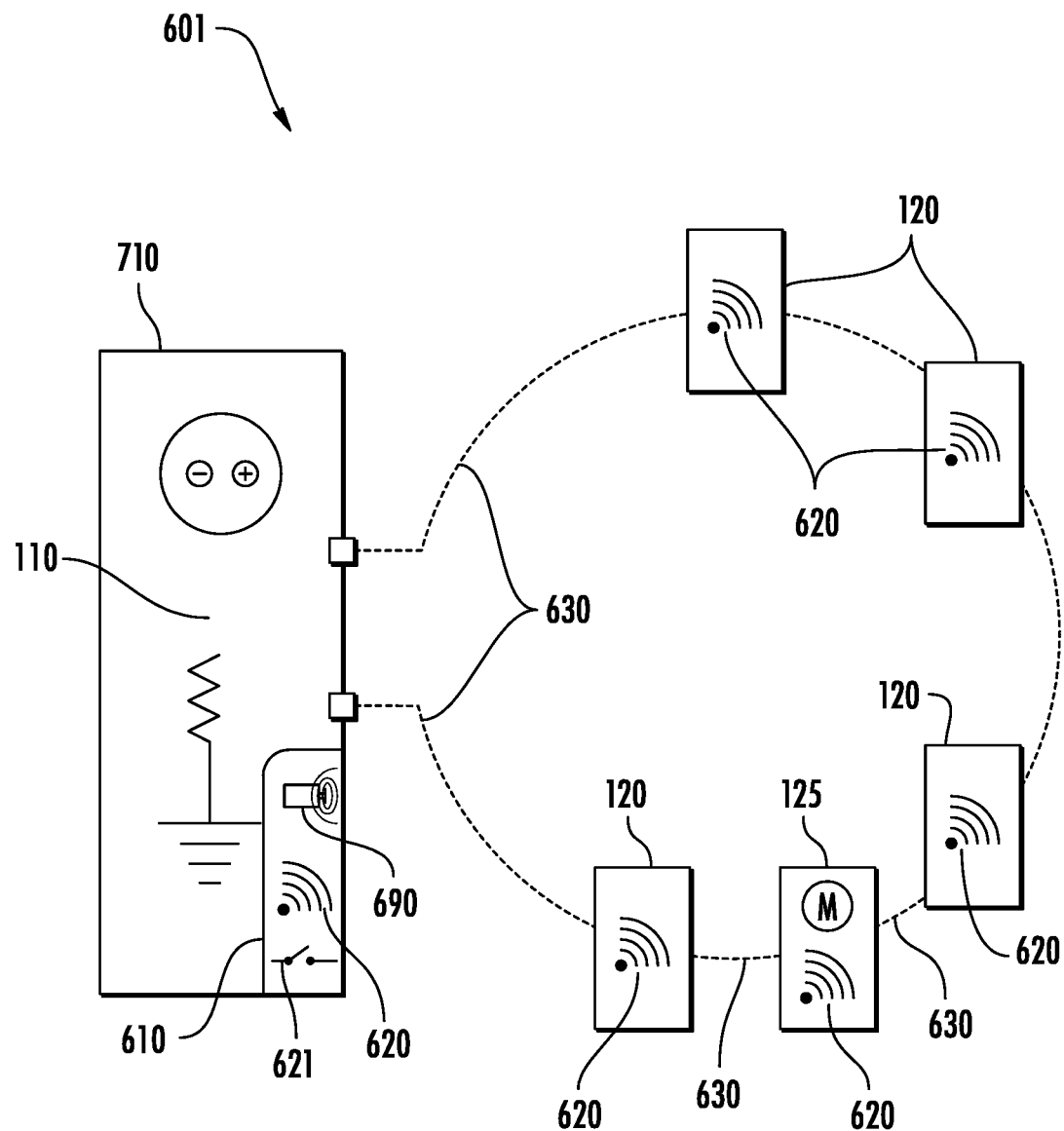
FIG. 12 is another embodiment of the present invention, a wireless HVIL using RFID-enabled electrical connectors.
Figure 14:
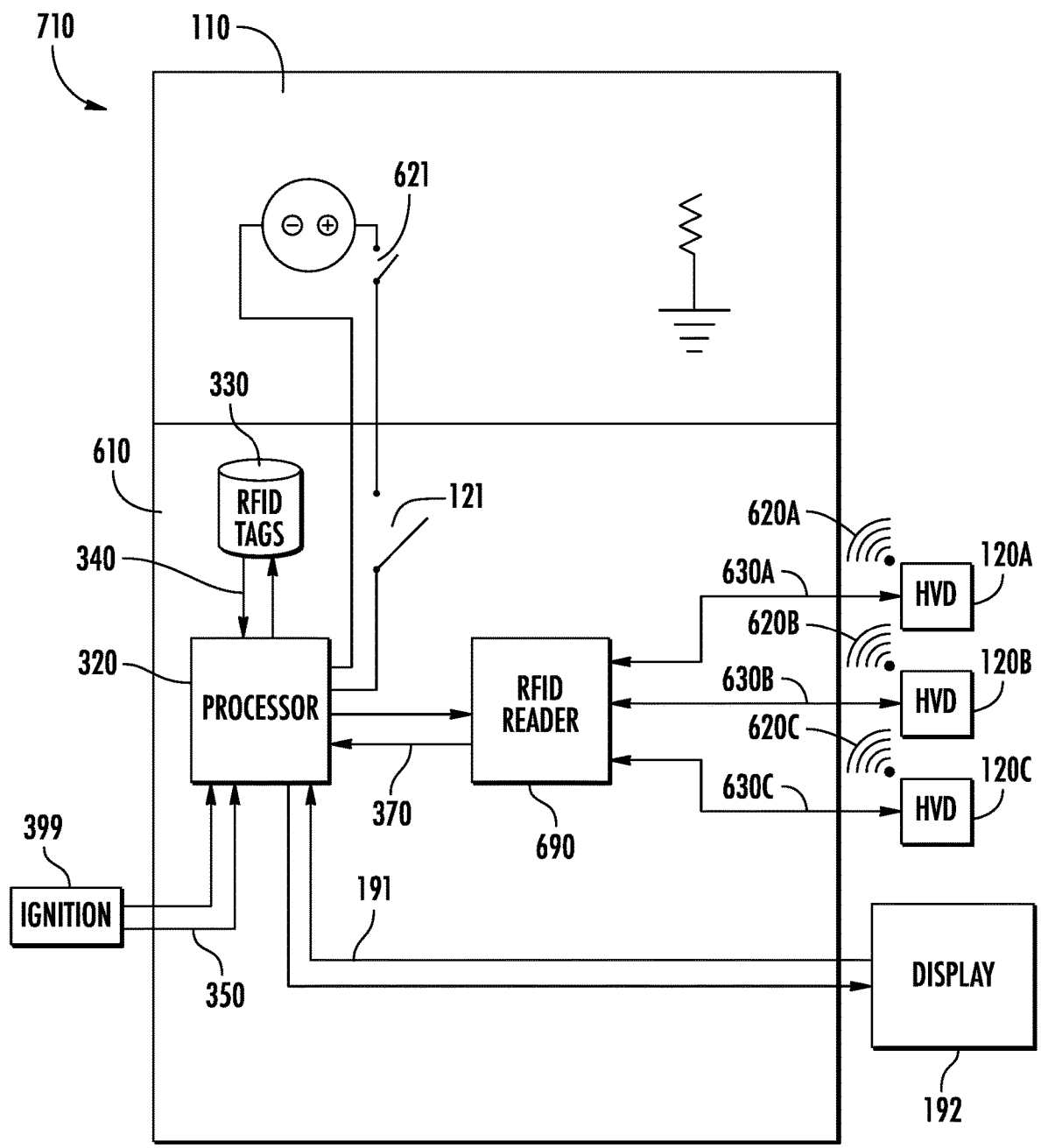
FIG. 14 is a system architecture of another embodiment of the present invention, a wireless HVIL using RFID-enabled electrical connectors.

FIGS. 12 and 14 show an alternative embodiment in which the functionality of the HVIL Control box 610 is embedded with the power supply 110 into a single device 710, an integrated HV power supply and wireless HVIL control box. In addition to the integrated power supply 710, this HVIL system 601, is comprised of a plurality of HV devices 620, each with its own RFID tag 620 and unique RFID identifier 620; and a motor 125 with its own RFID tag 620 and unique RFID identifier 620. These devices are connected wirelessly 630.

The integrated HV power supply and wireless HVIL control box 610 is comprised of a power supply 110 with a system switch 621; and a wireless HVIL control box 610. The wireless HVIL control box 610 has an RFID tag 620, RFID reader 690, and HVIL switch 121. In FIG. 14, more detail of the integrated HVIL control box 610 is apparent. Present are an RFID reader 690, a switch 121, a processor 320, and a non-transitory computer-readable HVIL memory element 330. There is an external display 192 which the processor 320 can send messages 191 to, such as an error message 191. As shown in FIG. 14, the display 192 is external to the integrated power supply and wireless HVIL control box 710. However, it should be understood by one skilled in the arts that the display 192 may just as easily be rendered internal to the integrated power supply and HVIL control box 710. The processor 320 can display 191 information on the display 192. The processor 320 can access 340 the non-transitory computer-readable HVIL memory element 330. The non-transitory, computer-readable HVIL memory element 330 contains a list of all of the unique RFID tag identifiers 620A, 620B, 620C in the wireless RFID system 601. The processor 320 can access 370 the RFID reader 690. The RFID reader 690 can detect the RFID tags 620A, 620B, 620C of the HV devices 120A, 120B, 120C that are transmitted over the wireless HVIL via the air 630A, 630B, 630C. The HVIL control box 610 is integral with the HV power supply 110 in an integrated power supply and control box 710 The HV power supply 110 has a system switch 621 that kills the power to all components 120, 125.

When the vehicle ignition 399 is cycled on, the power 350 to the HVIL Control box 610 is cycled on. The RFID reader 690 emits a digital pulse and detects the unique RFID identifier 620A, 620B, 620C from each of a plurality of HV devices 120A, 120B, 120C. As discussed in conjunction with FIGS. 1-4, the RFID tag 20 of the RFID-enabled Electrical Connector 1 can be read by an RFID reader 690 only when the CPA features 11, 16, 60, 50, 41, and 10 have been properly deployed, verifying that the connector housing 13 is positionally locked with respect to the socket 31. The unique RFID identifier 620A, 620B, 620C are only available if the CPA features are properly deployed for each RFID-enabled Electrical Connector 1 of each HV device 120A, 120B, 120C. The processor 320 compares the RFID identifiers 620A, 620B, 620C detected by the RFID reader 690 with the RFID identifiers stored in the list on the non-transitory computer-readable HVIL memory element 330. If all of the unique RFID identifiers 620A, 620B, 620C are detected, the processor 320 closes the HVIL switch 121 indicating to the power supply 110 to close the system switch 621, energizing the HV power circuit.

If the RFID reader 690 fails to detect one or more of the unique RFID identifiers 620A, 620B, 620C, the processor 320 can direct the RFID reader 690 to emit an additional digital pulse and attempt to detect all of the unique RFID identifiers again. The processor 320 again compares the RFID identifiers 620A, 620B, 620C detected by the RFID reader 690 with the RFID identifiers stored in the list on the non-transitory computer-readable HVIL memory element 330. If all of the unique RFID identifiers 620A, 620B, 620C are detected, the processor 320 closes the HVIL switch 121 indicating to the power supply 110 to close the system switch 621, energizing the HV power circuit. This process can be repeated until the number of attempts reaches a pre-defined threshold, at which point the processor sends an error message 360 to the display 310. The error message 360 can indicate in which of the plurality of HV devices 120A, 120B, 120C the fault was detected. This would of course be the HV device or devices 120A, 120B, 120C for which the RFID reader 690 was unable to read the unique RFID identifiers 620A, 620B, 620C. So, in other words, the method of the invention does not depend on the configuration used for the HVIL control box 610 functionality.

We claim:

1. A wireless HVIL system using RFID-enabled electrical connectors comprised of
    a plurality of HV devices, each HV device having an RFID-enabled electrical connector;
    at least one RFID tag reader, each RFID tag reader having an effective range;
    an HVIL switch;
    an HVIL processor;
    and an HV power supply having an RFID-enabled electrical connector;
    wherein each RFID-enabled electrical connector is comprised of
        deployable connector position assurance ("CPA") features;
        a socket;
        a plug; and
        an RFID tag having a unique RFID identifier;
        wherein the RFID tag is obscured from being read by any of the at least one RFID readers until the CPA features have been properly deployed;
    wherein all RFID-enabled electrical connectors lie within the effective range of the at least one RFID reader;
    wherein, upon power being cycled on to the system, the at least one RFID reader sends a digital pulse and reads all of the unique RFID tags that are within range; and
    wherein the HVIL processor compares all of the unique RFID tags read by the at least one RFID reader with the unique RFID tag identifiers expected to be received from the HV power supply and the plurality of HV devices.

2. The wireless HVIL system using RFID-enabled connectors of claim 1, further comprising a non-transitory, computer-readable HVIL memory element; wherein the unique RFID identifier associated with each of the HV power supply and the plurality of HV devices is stored on the non-transitory, computer-readable HVIL memory element as a list.

3. The wireless HVIL system using RFID-enabled connectors of claim 2, wherein the HVIL processor compares all of the unique RFID tags read by the at least one RFID reader with the unique RFID tag identifiers expected to be received from the HV power supply and the plurality of HV devices, by matching one-to-one, the unique RFID tags read by the at least one RFID reader with the list stored on the non-transitory, computer-readable HVIL memory element.

4. The wireless HVIL system using RFID-enabled electrical connectors of claim 3 further comprising, for each of the RFID-enabled electrical connectors contained within the system,
    a connector housing, connected to the plug, and
    a socket housing connected to the socket;
    wherein the RFID tag is affixed to the connector housing;
    wherein the connector housing is capable of being inserted into the socket in such a way as to fully deploy all of the CPA features and creating an electrical connection between the plug and the socket; and
    wherein the socket housing is fabricated from an electrically conductive material, so that when the CPA features have not been fully deployed, the electrically conductive material obscures the RFID tag affixed to the connector housing of the plug from the first RFID reader.

5. The wireless HVIL system using RFID-enabled electrical connectors of claim 3, wherein, for each of the RFID-enabled electrical connectors contained within the system, the RFID tag is passive, meaning that the RFID tags rely on the fields generated by the digital pulses of the at least one RFID readers in order to be energized because the RFID tag has no independent power source.

6. The wireless HVIL system using RFID-enabled electrical connectors of claim 5, wherein, for each of the RFID-enabled electrical connectors contained within the system, when the CPA feature have not been properly deployed, the RFID tag is obscured from being read by the first RFID reader by an electrically conductive material that shields the RFID tag from being energized and read by any of the at least one RFID readers.

7. The wireless HVIL system using RFID-enabled electrical connectors of claim 6, wherein the electrically conductive material is an electrically conductive polymer.

8. The wireless HVIL system using RFID-enabled electrical connectors of claim 7, wherein, when the HVIL processor detects that the at least one RFID readers have read every unique RFID identifier stored in the non-transitory, computer-readable HVIL memory element, the HVIL processor closes the HVIL switch.

9. The wireless HVIL system using RFID-enabled electrical connectors of claim 8, wherein, when the HVIL processor closes the HVIL switch, the HV power supply delivers power to each of the plurality of HV devices.

10. The wireless HVIL system using RFID-enabled electrical connectors of claim 7, wherein, when the HVIL processor fails to detect that the at least one RFID readers have read every unique RFID identifier stored in the non-transitory, computer-readable HVIL memory element, the HVIL processor will make an additional attempt to detect that the at least one RFID readers have read every unique RFID identifier stored in the non-transitory, computer-readable HVIL memory element, provided that the total number of attempts since the power was cycled remains at or below a pre-defined threshold.

11. The wireless HVIL system using RFID-enabled electrical connectors of claim 10, wherein, when, during an additional attempt, the HVIL processor confirms that the RFID reader has read every unique RFID identifier stored in the non-transitory, computer-readable HVIL memory element, the HVIL processor closes the HVIL switch.

12. The wireless HVIL system using RFID-enabled electrical connectors of claim 11, wherein, when the HVIL processor closes the HVIL switch, the HV power supply delivers power to each of the plurality of HV devices.

13. The wireless HVIL system using RFID-enabled electrical connectors of claim 10, wherein, when an additional attempt would cause the HVIL processor to surpass the pre-defined threshold, the HVIL processor sends an error message.

14. The wireless HVIL system using RFID-enabled electrical connectors of claim 13, wherein the error message displays the name of every HV device for which the at least one RFID readers failed to receive the unique RFID identifier.

15. The wireless HVIL system using RFID-enabled electrical connectors of claim 7, wherein the HVIL processor, the non-transitory, computer-readable HVIL memory element, the HVIL switch, and a first RFID reader are embedded in the HV power supply.

16. The wireless HVIL system using RFID-enabled electrical connectors of claim 7, wherein the HVIL processor, the non-transitory, computer-readable HVIL memory element, the HVIL switch, and a first RFID reader are contained in an HVIL control box.

17. The wireless HVIL system using RFID-enabled electrical connectors of claim 16, wherein the HVIL control box further comprises an active RFID tag with a unique identifier.

18. The wireless HVIL system using RFID-enabled electrical connectors of claim 17, wherein the HV power supply further comprises a second RFID reader, a power switch, and a power supply processor.

19. The wireless HVIL system using RFID-enabled electrical connectors of claim 18, wherein, when the HVIL processor detects that the first RFID reader has read every unique RFID identifier stored in the non-transitory, computer-readable HVIL memory element, the HVIL processor closes the HVIL switch, causing the active RFID tag in the HVIL control box to transmit.

20. The wireless HVIL system using RFID-enabled electrical connectors of claim 19, wherein, when the second RFID reader detects the unique RFID tag from the HVIL control box, the power supply processor closes the power supply switch, causing the HV power supply to deliver power to each of the plurality of HV devices.

21. The wireless HVIL system using RFID-enabled electrical connectors of claim 18, wherein, when the HVIL processor fails to detect that the first RFID reader has read every unique RFID identifier stored in the non-transitory, computer-readable HVIL memory element, the HVIL processor will make an additional attempt to detect that the first RFID reader has read every unique RFID identifier stored in the non-transitory, computer-readable HVIL memory element, provided that the total number of attempts since the power was cycled remains at or below a pre-defined threshold.

22. The wireless HVIL system using RFID-enabled electrical connectors of claim 21, wherein, when, during an additional attempt, the HVIL processor confirms that the first RFID reader has read every unique RFID identifier stored in the non-transitory, computer-readable HVIL memory element, the HVIL processor closes the HVIL switch, causing the RFID tag in the HVIL control box to transmit.

23. The wireless HVIL system using RFID-enabled electrical connectors of claim 22, wherein, when the second RFID reader detects the unique RFID tag from the HVIL control box, the power supply processor closes the power supply switch, causing the HV power supply to deliver power to each of the plurality of HV devices.

24. The wireless HVIL system using RFID-enabled electrical connectors of claim 21, wherein, when an additional attempt would cause the HVIL processor to surpass the pre-defined threshold, the HVIL processor sends an error message.

25. The wireless HVIL system using RFID-enabled electrical connectors of claim 24, wherein the error message displays the name of every HV device for the first RFID reader failed to receive the unique RFID identifier.

26. A method for implementing a wireless HVIL comprising the steps of
assembling a high-voltage system containing a HV power supply and a plurality of HV devices;
assigning the HV power supply and each of a plurality of HV devices with its own unique identifier embodied on an RFID tag;
creating a list of all unique identifiers embodied on an RFID tag;
storing the list on a non-transitory, computer readable memory element;
embedding the RFID tag of the HV power supply and of each of the plurality of HV devices in an electrical connector having a socket and a plug, wherein the electrical connector has CPA features designed so that the RFID tag is obscured by conductive material when the CPA features have not been fully deployed;
cycling power on;
detecting all non-obscured RFID tags using at least one RFID reader; and
comparing the list of all unique identifiers with all of the non-obscured RFID tags detected by the at least one RFID reader.

27. The method for implementing a wireless HVIL of claim 26, further comprising the steps of
determining that all of the unique identifiers contained in the list have been detected by the at least one RFID reader; and
closing an HVIL switch.

28. The method for implementing a wireless HVIL of claim 27, further comprising the step of
supplying HV power from the HV power supply to each of the plurality of HV devices.

29. The method for implementing a wireless HVIL of claim 27, further comprising the steps of
transmitting an additional unique identifier contained on an additional RFID tag as the result of closing the HVIL switch;
detecting the unique identifier of the additional RFID tag using an RFID reader;
closing a power supply switch; and
supplying HV power from the HV power supply to each of the plurality of HV devices.

30. The method for implementing a wireless HVIL of claim 26, further comprising the step of
determining that all of the unique identifiers contained in the list have not been detected by the first RFID reader.

31. The method for implementing a wireless HVIL of claim 30, further comprising the steps of making an additional attempt to detect all of the non-obscured RFID tags, provided that the total number of attempts does not exceed a pre-defined threshold.

32. The method for implementing a wireless HVIL of claim 31, further comprising the steps of
determining that all of the unique identifiers contained in the list have now been detected by the at least one RFID reader;
closing an HVIL switch; and
supplying HV power from the HV power supply to each of the plurality of HV devices.

33. The method for implementing a wireless HVIL of claim 30, further comprising the steps of
determining that the number of attempts made has exceeded the pre-defined threshold;
transmitting an error message;
displaying the names of each of the HV power supply and plurality of HV devices; and
highlighting on the display the names for which the RFID tag was obscured.

* * * * *